May 2, 1950 C. C. DE PEW ET AL 2,505,853
OUTPUT SHAFT COUPLING MECHANISM
FOR MULTIPLE POWER PLANTS
Original Filed Jan. 28, 1944 3 Sheets-Sheet 1

INVENTORS
ALFRED T. GREGORY
CHESTER C. DE PEW
BY
ATTORNEY

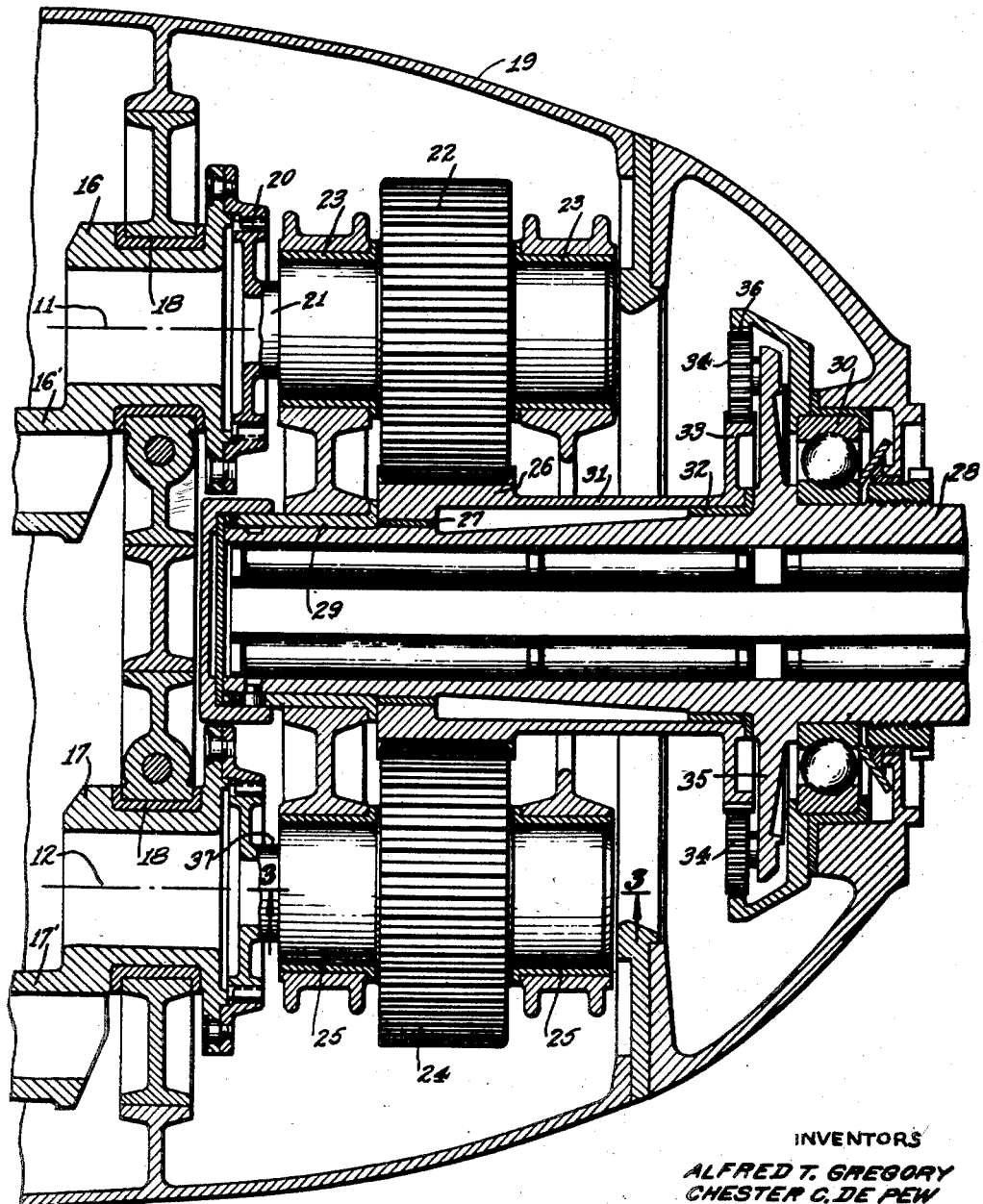

May 2, 1950

C. C. DE PEW ET AL 2,505,853

OUTPUT SHAFT COUPLING MECHANISM
FOR MULTIPLE POWER PLANTS

Original Filed Jan. 28, 1944

INVENTORS
ALFRED T. GREGORY
CHESTER C. DE PEW
BY
ATTORNEYS

Patented May 2, 1950

2,505,853

UNITED STATES PATENT OFFICE 2,505,853

OUTPUT SHAFT COUPLING MECHANISM FOR MULTIPLE POWER PLANTS

Chester C. De Pew, Farmingdale, and Alfred T. Gregory, Massapequa, N. Y., assignors to Fairchild Engine and Airplane Corporation, Farmingdale, N. Y., a corporation of Maryland Continuation of application Serial No. 520,040, January 28, 1944. This application December 29, 1948, Serial No. 67,958

6 Claims. (Cl. 74—665)

This invention relates to internal combustion engines, and has particular reference to engines having two crankshafts for driving one or more aircraft propellers, although the invention is not limited to aeronautical use. This application is a continuation of copending application Serial No. 520,040, filed January 28, 1944, now forfeited.

Multiple crankshaft aeronautical engines have been devised heretofore involving the use of two crankshafts for driving coaxial counter-rotating propellers, each propeller being independently driven by a corresponding crankshaft so that in effect two engines are in use, or both crankshafts drive a common shaft connected to one propeller with the other propeller being driven in the opposite direction from the common shaft through reversing gearing. In the case of the independently driven propellers, the corresponding crankshafts are severally operated by corresponding complete engines or by separate banks of cylinders severally connected to the corresponding crankshafts and operating in effect as separate engines. It is desirable to have both crankshafts connected to the propeller shaft or shafts, so that failure of one crankshaft driving mechanism will not disable the propeller drive except to reduce its power. Also, it is desirable to place one crankshaft out of operation at will under conditions of lower power requirements, as when cruising, which suggests the use of a clutch, but the mere interposition of a clutch does not suffice because the clutch creates the problem of securing necessary synchronization between the two crankshafts when it becomes necessary to reclutch the inactive crankshaft unit to the propeller shaft or shafts. The provision of a self-synchronizing clutch mechanism which enables clutching and declutching of the two crankshaft units while automatically attaining and maintaining synchronism between them is accordingly necessary to solve the problem, and the present invention is primarily directed to the provision of a multiple crankshaft engine embodying said self-synchronizing clutch mechanism.

In accordance with the present invention, a multiple crankshaft aeronautical engine is provided in which two crankshafts severally driven by separate banks of cylinders are directly geared together and to the propeller shaft or shafts. Interposed between one of the crankshafts and the connected gearing is a self-synchronizing clutch mechanism whereby one crankshaft unit may be connected to or disconnected from the other crankshaft unit and the propeller shaft at will, so that both crankshafts operate together in synchronism, or one crankshaft operates alone and without disconnecting the propeller shafting.

By means of the organization of gearing and synchronizing clutch mechanism described, one of the two crankshaft units, comprising cylinders and its crankshaft, is set into operation when starting the engine and after it has attained a predetermined rate of rotation it is employed to start the other crankshaft unit by means of the self-synchronizing clutch mechanism which is engaged to connect the second, theretofore inactive, crankshaft into operation under such conditions that the second crankshaft does not cooperate in the driving operation until it has achieved synchronism with the first or starting crankshaft and then it is automatically coupled thereto. After synchronism between the two crankshafts has thus been automatically achieved, it is maintained during the entire operating period of the engine.

Preferably, the bank of cylinders driving each crankshaft comprises two rows of cylinders arranged substantially in a common vertical plane but on the same crankcase so that the engine is an H-type engine, although the cylinders for each crankshaft may be arranged otherwise, depending on requirements, and thus may form a star engine, opposed cylinder pancake engine, or other form involving the use of two crankshafts.

It will be seen that the internal combustion engine of this invention provides many advantages, including the increased power obtainable with the multiple crankshaft arrangement, but without involving the complications accompanying the use of such engines, but on the contrary, it has practically the simplicity, lightness, and operating advantages of a single crankshaft engine having an equal number of cylinders. As will be observed, one of the crankshaft-cylinder components may be operated alone without disturbing the aeronautical balance of the craft and without undue stresses occasioned by the connection or disconnection of the second crankshaft to and from the propeller mechanism.

For a more complete understanding of the invention, reference may be had to the accompanying drawings, in which:

Fig. 2 is a horizontal enlarged section through the propeller driving mechanism of the engine of Fig. 1, as seen along the line 2—2 of Fig. 1;

Figure 1:
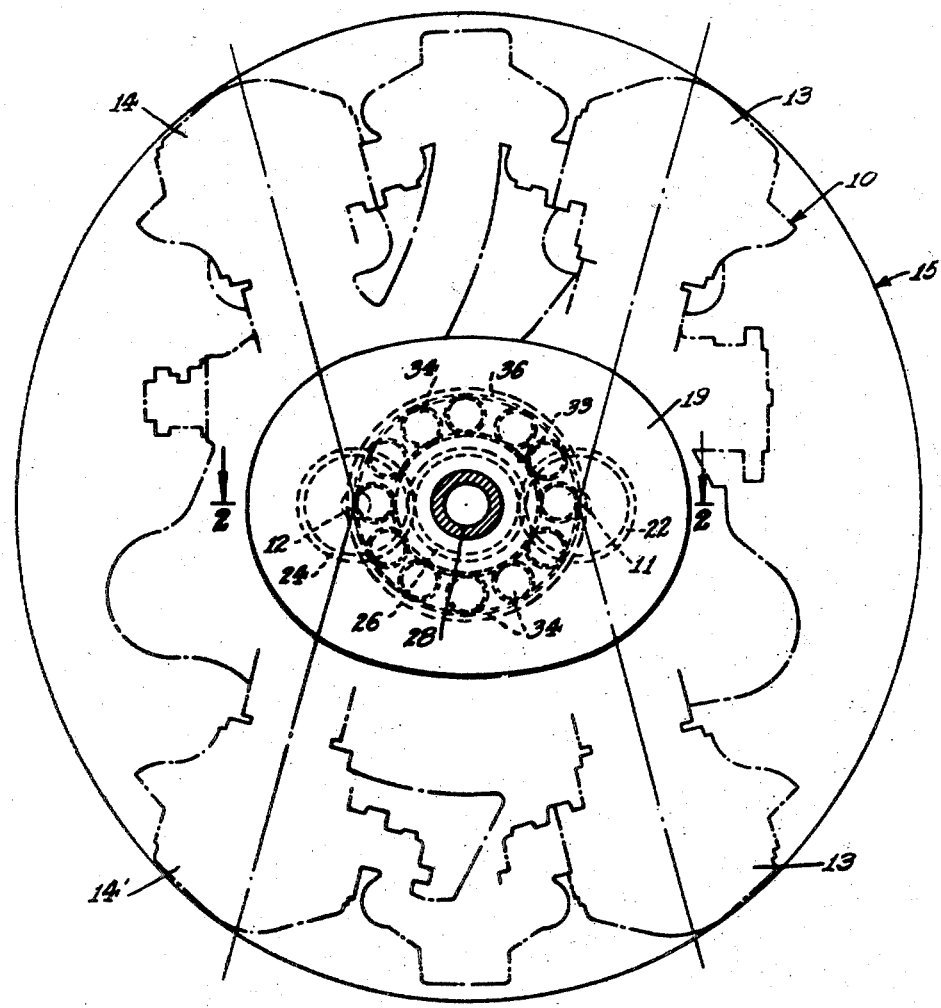
Figure 1 is a propeller end view of the internal combustion engine of this invention.

Referring to Fig. 1 of the drawings, numeral 10 designates an aeronautical engine having two crankshafts whose centers are located at 11 and 12, each of which is operated by two rows of cylinders arranged substantially in the vertical plane of the corresponding crankshaft, although they are inclined with respect to the vertical of plane as shown for purposes of accessibility of the auxiliaries and other parts located between the two rows of cylinders at the top and the bottom of the engine. The outline of engine 10 is shown in silhouette by dotted lines in Fig. 1, since the particular construction of the cylinders and combustion chambers of the engine form no part of the present invention. Thus, the upper row of cylinders designated 13 and the lower row of cylinders designated 13' at the right hand side of the engine operate a crankshaft whose center is located at 11, while the upper row of cylinders 14 and the lower row of cylinders 14' at the other or left hand side of the engine operate the crankshaft whose center is located at 12. The crankshafts are driven in the same direction of rotation.

Each row of cylinders, 13, 13', 14, 14', may comprise six cylinders, for example, so that the entire engine organization comprises twenty-four cylinders, the rows 13 and 13' constituting two cylinder banks for one crankshaft and the rows 14 and 14' constituting two cylinder banks for the other crankshaft, so that each crankshaft with its cylinder banks comprise in fact a twelve cylinder wide V-type engine unit in the example given, and each unit is provided with fuel supply, ignition and other systems required for operation, so that when both units are in operation in synchronism, the engine constitutes a unitary power plant which may be enclosed within suitable cowling, such as that designated 15 in Fig. 1. However, when only one unit is operating the other unit is entirely inactive, and its fuel supply, including the air induction system, the ignition, and the like, are all shut off.

Referring to Fig. 2, the crankshaft whose center of rotation is located at 11 is designated 16, and the crankshaft whose center of rotation is located at 12 is designated 17. Only the propeller ends of the two crankshafts are shown in Fig. 2, since as before mentioned, the remainder of the engine, including details of cylinder, piston and other crankshaft construction form no part of the present invention. Accordingly, it is sufficient to illustrate the propeller end of each crankshaft which is journalled in bearings 18 mounted on the housing 19 projecting forwardly from the engine as an extension of the crankcase, this housing bearing the relation to the engine that is indicated in Fig. 2 by the position of the crank-pins 16' and 17' of the front cylinders of the corresponding banks.

Connected by a spline 20 to the propeller end of crankshaft 16 is a quill shaft 21 carrying the spur pinion 22, which is designated by the same numeral in Fig. 1. The hub of the spur pinion 22 is suitably journalled in bearings 23 mounted in the housing 19. Similarly, the propeller end of crankshaft 17 is fitted with the spur pinion 24, which is designated by the same numeral in Fig. 1. The hub of spur pinion 24 is also suitably journalled in bearings 25 mounted in the housing 19.

Both spur pinions 22 and 24 on crankshafts 16 and 17, respectively, mesh with gear 26 journalled on a suitable bearing 27 on the propeller shaft 28 which in turn is journalled in bearings 29 and 30 in housing 19 as shown particularly in Fig. 2. Gear 26 has the same diameter as crankshaft spur pinions 22 and 24 with which it meshes, so that a one-to-one driving ratio is provided. The gear relation is illustrated in Fig. 1, where gear 24 is designated by the same numeral.

The quill 31 of gear 26 is journalled at its forward end on bearing 32 and is provided with the sun gear 33 of a planetary reduction gearing connecting gear 26 with propeller shaft 28 for driving the latter at the proper speed. The planet pinions 34, also shown in Fig. 1, are carried by spider 35 formed integrally with propeller shaft 28. These pinions 34 mesh with sun gear 33 and also with stationary ring gear 36 secured to the housing 19. As gear 26 is driven, its sun gear 33 causes planet pinions 34 to roll around stationary ring gear 36 to thereby rotate propeller shaft 28 through spider 35 at the predetermined reduction ratio. This gearing provides a direct speed reducing drive to the propeller shaft 28 and the corresponding front propeller.

Positioned within pinion 24 of crankshaft 17 is a self-synchronizing clutching mechanism whereby crankshaft 17 may be connected to or disconnected from crankshaft 16 at will. However, disconnection of crankshaft 17 does not stop or otherwise affect the rotation of propeller shaft 28, because of its direct connection with operating crankshaft 16. The self-synchronizing clutching mechanism which enables one crankshaft to operate without affecting the operation of the propeller in the manner described is illustrated in enlarged axial section in Fig. 3. The quill 37 of crankshaft 17 is fitted with axial splines 38 upon which are slidable axially but not circumferentially the spaced friction discs 39, which may be eight in number, as shown. The interior of driving pinion 24 is also fitted with axial splines 40 on which are slidable axially but not circumferentially the eight complementary friction discs 41 which fit between the discs 39 connected to the crankshaft quill 37.

Also mounted on internal spline 40 in pinion 24 so as to rotate therewith in bearing 25 is an axially fixed retaining plate 42 held in place by snap ring 43. Engaging the other end of the interleaved friction discs 39 and 41 is a presser plate 44 which is slidable axially within the annular space formed between the interior of pinion 24 and the exterior of quill 37 and containing the annular piston 45 engaging presser plate 44. The back of piston 45 is hollow and forms pressure chamber 46 with the flange of the gear 24. When chamber 46 is supplied with pressure fluid, such as oil under pressure, piston 45 is caused to move to the left, as seen in Fig. 3, to force presser plate 44 against the stack of friction discs 39, 41 to cause pinion 24 to be clutched to quill 37 and in turn to crankshaft 17, and vice versa.

Figure 4:
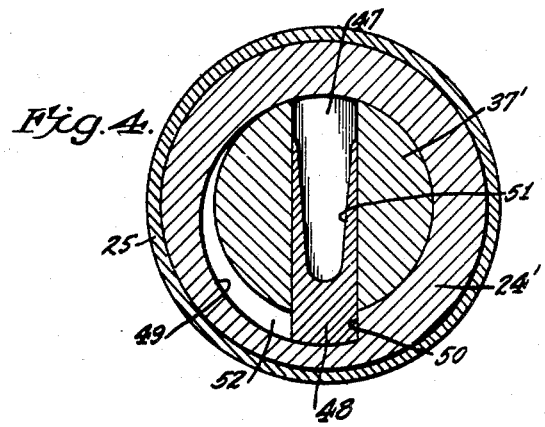
Fig. 4 is a section through the synchronizing ratchet as seen along line 4—4 of Fig. 3.

The free end 37' of the quill 37 extends into the hub 24' of the pinion 24 which is journalled within the bearing 25, and this free end 37' is provided with a diametral slot 47, also shown in the section constituting Fig. 4. Slidably mounted in this slot 47 for radial movement is a synchronizing dog 48 whose outer end slidingly engages the eccentric or spiral inner surface 49 of hub 24' of gear 24. The ends of eccentric or spiral surface 49 cooperate to form the abutment 50 against which the free end of dog 48 is adapted to abut, as shown in Fig. 4, this arrangement constituting a one-way clutch or ratchet construction between quill 37 of crankshaft 17 and its pinion 24.

The inner end of dog 48 is provided with a V-shaped slot or groove 51 so as to position its center of gravity near its outer end, the thin side walls of the slot 51 forming guides for the dog 48 in slot 47. The space 52 between hub 24' and the free end 37' of quill 37 is supplied with oil under pressure through a radial passage 53 in hub 24' communicating with an annular groove 54 in the bearing 25. This annular groove 54 is connected by pipe 55 with a two-way valve 56 having one end of its curved passage 57 connectible to pressure oil supply pipe 58 leading from an oil pump or the like, and the other end of passage 57 connectible to discharge pipe 59. When the handle 60 is moved to the on-position shown in Fig. 3, oil flows from supply pipe 58 through valve passage 57, pipe 55, annular groove 54, passage 53 and space 52 into chamber 46 to cause piston 45 to force presser plate 44 into engagement with the friction discs 39 and 41, which, being forced together between presser plate 44 and axially-fixed back plate 42, causes pinion 24 to be clutched to quill 37 of crankshaft 17, and vice versa. When valve handle 60 is moved to the off-position, the passage 57 in valve 56 connects pipe 55 to discharge pipe 59, so that the pressure on the friction discs 39 and 41 is relieved, causing the clutch to disengage and pinion 24 to be disconnected from quill 37 of crankshaft 17, and vice versa.

Figure 3:
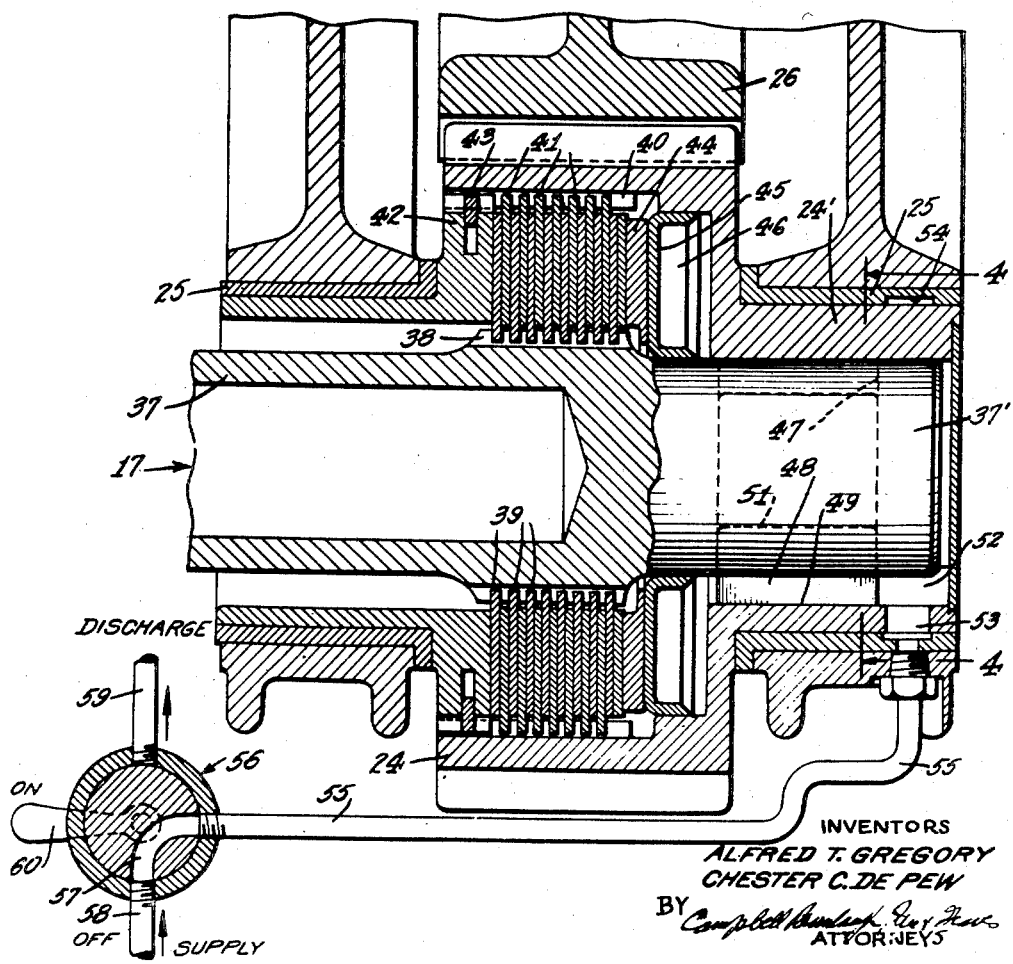
Fig. 3 is an enlarged axial section through the driving pinion on one of the crankshafts as seen along the line 3—3 of Fig. 2, and illustrates the synchronizing clutching mechanism for placing the corresponding crankshaft into and out of driving operation.

In operation of the engine illustrated in Figs. 1 and 2, when equipped with the self-synchronizing clutch mechanism illustrated in Figs. 3 and 4, the engine may be started by means of a conventional inertia or other starter connected to crankshaft 16 with pinion 24 disconnected from quill 37 of crankshaft 17 by reason of disengagement of the clutch shown in Fig. 3, the valve 56 being in the off-position. Accordingly, the right hand engine cylinder bank 13, 13' of Fig. 1 is started into operation to drive corresponding crankshaft 16 independently of crankshaft 17. It will be observed that propeller shaft 28 is driven notwithstanding the fact that crankshaft 17 is not in driving operation. The connection to propeller shaft 28 from operating crankshaft 16 is through gear train 22, 26, 33 and 34 to spider 35 on propeller shaft 28.

If the pilot or other operator desires to place the entire engine in full operation at once, he starts the other crankshaft unit, comprising cylinder banks 14 and 14' and crankshaft 17, when crankshaft 16 has achieved a predetermined rotational speed which may be approximately 2000 revolutions per minute, for example. This is accomplished by means of valve 56, which is moved by the operator to the on-position to supply oil under pressure from supply pipe 58 to pipe 55 whence it flows through annular groove 54, passage 53, and space 52 to chamber 46, so as to cause piston 45 to force presser plate 44 to compress the friction discs 39, 41 and thus connect pinion 24 to the quill 37 of crankshaft 17. This coupling of pinion 24 to crankshaft 17 causes crankshaft 16 to rotate crankshaft 17 through gears 22, 26 and 24.

When crankshaft 17 is being rotated by crankshaft 16 at the aforementioned predetermined speed, say 2000 revolutions per minute, the operator closes the ignition switch for cylinder bank 14, 14' to cause the latter to drive crankshaft 17 simultaneously with operating crankshaft 16. Power then tends to flow from crankshaft 17 through the clutch shown in Fig. 3. When the power from crankshaft 17 is increased sufficiently, the torque produced by the shaft will exceed that required to produce slippage of the slip clutch. The rotational speed of pinion 24 will exert centrifugal force on dog 48, causing it to be forced against eccentric or spiral surface 49, creating a pressure drag thereon. As the torque of crankshaft 17 increases, it tends to overtake crankshaft 16 until dog 48 engages abutment or detent 50 when synchronism between the crankshafts is attained. The quill 37 of crankshaft 17 and pinion 24 are directly and positively connected together at the time that crankshaft 17 is in synchronism with crankshaft 16.

Upon engagement of dog 48 with abutment or detent 50, power is transmitted from both crankshafts 16 and 17 through the connecting gearing to the propeller shaft 28 and the engine operates as a complete unit with both crankshafts synchronized. Synchronism is maintained by reason of the direct gear interconnection of both crankshafts 16 and 17. If it is desired to disconnect crankshaft 17 from the remainder of the engine during flight in order to improve fuel economy, for example, so that the propeller is driven by only engine cylinder banks 13, 13', and crankshaft 16, the operator moves handle 59 to off-position to disconnect pinion 24 from quill 37 of crankshaft 17 and he also disconnects the ignition for engine cylinder banks 14, 14', and closes the throttles in the induction system to that side of the engine. Thereupon the engine operates as before but on approximately half power output provided by engine cylinder banks 13, 13'.

When crankshaft 17 is thus rendered inoperative, it slows down, and abutment 50 moves away from dog 48, which is then moved radially inwardly by the spiral surface 49, against the opposition of centrifugal force. Thereafter pinion 24 continues to rotate around stationary quill extension 37', since the former is driven from crankshaft 16 through gear train 22, 26 and 24 as described. Dog 48 and abutment or detent 50 thus act as a one-way positive drive ratchet clutch mechanism, and are and remain in positive engagement when the two crankshafts are synchronized, with power being delivered by both.

In case the engine is required to drive two coaxial propellers, the advantages of the invention may be realized in the same manner, except that both sides of the engine are connected to each propeller shaft, through suitable gearing, such as is shown, for example, in copending application Serial No. 579,028, filed February 21, 1945 by William J. Petre, now abandoned. Other changes may be made to suit particular operating requirements, it being understood that the invention is not limited to the particular embodiments described herein, but is susceptible of changes in form and detail within the scope of the appended claims.

We claim:

1. In a power plant having at least two output shafts, means for severally driving said shafts, a driven member, means connecting said shafts together and to said driven member, and mechanism in said connecting means for disconnecting one of said shafts from the other and from said driven member and for connecting them together at will, said mechanism comprising a clutch and a synchronizing device, said synchronizing device being responsive to equal torque of said shafts for positively connecting them together after engagement of said clutch, and being inoperative upon disengagement of said clutch.

2. In a power plant having at least two output shafts, means for severally driving said shafts, a driven member, means connecting said shafts together and to said driven member, mechanism in said connecting means for disconnecting one of said shafts from the other and from said driven member and for connecting them together at will, said mechanism comprising a slip clutch and a positive engagement clutch between said one shaft and the other shaft, and means for engaging and disengaging said slip clutch to permit engagement and disengagement of said positive engagement clutch.

3. In a power plant having at least two output shafts, means for driving each shaft and a driven member, the combination of connections from each shaft to said driven member and between said shafts, said connections including a pinion on each shaft, a first slip clutch between one of said shafts and its said pinion, a second positive engagement clutch between said one shaft and its said pinion, means for engaging and disengaging said first clutch, and means in said second clutch responsive to centrifugal force of rotation of said one shaft for rendering said second clutch effective to positively connect said shafts after engagement of said first clutch.

4. In a power plant having at least two output shafts and means for driving each shaft independently of the other and in the opposite direction, the combination of a pinion on one shaft, a pinion on the other shaft but normally disconnected therefrom, a gearing interposed between said shaft pinions, a driven member connected to said gearing, a slip clutch interposed between said other shaft and its pinion for connecting said other shaft to said one shaft for drive thereby, means for energizing the driving means of said other shaft driven by said one shaft to cause said other shaft to operate independently of said one shaft, and a ratchet clutch interposed between said other shaft and its pinion and rendered effective by said slip clutch to positively connect said other shaft to said one shaft through said gearing when said other shaft attains the torque of said one shaft, slippage of said slip clutch affording relative movement between the elements of said ratchet clutch until they engage.

5. In a power plant having at least two output shafts and power means for driving each shaft independently of the other, the combination of a pinion on one shaft, a pinion on the other shaft but normally disconnected therefrom, gearing interposed between said shaft pinions, driven members connected to said gearing, a slip clutch interposed between said other shaft and its pinion for connecting said other shaft to said one shaft for drive thereby, means for energizing the power means of said other shaft driven by said one shaft to cause said other shaft to operate independently of said one shaft, and a ratchet clutch interposed between said other shaft and its pinion and rendered effective by said slip clutch to positively connect said other shaft to said one shaft through said gearing when said other shaft exceeds the slippage torque of said slip clutch, slippage of said slip clutch affording relative movement between the elements of said ratchet clutch until they engage.

6. A clutch and synchronizing device for connecting one shaft driven by a first power unit to another shaft driven by another power unit in synchronism and to a driven member driven from said second named shaft, comprising means including a slip clutch connecting said one shaft and said other shaft and said driven member for driving said one shaft from said second shaft and permitting relative movement between said shafts, and a one-way positive clutch for drivingly connecting said one shaft to said other shaft and to said driven member when said first power unit tends to drive said one shaft at higher speed than said other shaft.

CHESTER C. DE PEW.
ALFRED T. GREGORY.

No references cited.